US008240682B2

(12) United States Patent
Kennard

(10) Patent No.: US 8,240,682 B2
(45) Date of Patent: Aug. 14, 2012

(54) JACKHAMMER TROLLEY

(76) Inventor: Rory Kennard, Long Beach, CA (US)

( * ) Notice: Subject to any disclaimer, the term of this patent is extended or adjusted under 35 U.S.C. 154(b) by 393 days.

(21) Appl. No.: 12/553,984

(22) Filed: Sep. 4, 2009

(65) Prior Publication Data

US 2010/0059949 A1 Mar. 11, 2010

(30) Foreign Application Priority Data

Sep. 8, 2008 (AU) ................................ 2008904632

(51) Int. Cl.
*B62B 1/00* (2006.01)

(52) U.S. Cl. ..................... 280/47.21; 280/798; 173/125; 173/126

(58) Field of Classification Search .................... 280/43, 280/798, 47.21, 47.26, 43.2; 173/90, 169, 173/170, 31, 112, 24, 184, 21, 162.2, 186, 173/89, 28, 125, 126
See application file for complete search history.

(56) References Cited

U.S. PATENT DOCUMENTS

| | | | | |
|---|---|---|---|---|
| 1,898,369 | A * | 2/1933 | Hohmann et al. | 173/186 |
| 2,659,583 | A * | 11/1953 | Dorkins | 173/28 |
| 2,904,320 | A * | 9/1959 | Salisbury et al. | 173/24 |
| 3,627,064 | A * | 12/1971 | Sjoberg et al. | 173/24 |
| 4,548,279 | A * | 10/1985 | Zaruba | 173/170 |
| 4,667,746 | A * | 5/1987 | Moraly | 173/89 |
| 4,986,370 | A * | 1/1991 | Johnson et al. | 173/31 |
| 5,462,127 | A * | 10/1995 | Svensson | 173/162.2 |
| 5,667,021 | A * | 9/1997 | Bailey et al. | 173/21 |
| 6,050,345 | A * | 4/2000 | Jarvinen et al. | 173/31 |
| 7,063,172 | B1 * | 6/2006 | Marentette | 173/184 |
| 7,694,749 | B2 * | 4/2010 | Sorric et al. | 173/90 |
| 2007/0228805 | A1 * | 10/2007 | Due | 299/37.1 |

* cited by examiner

*Primary Examiner* — Hau Phan
(74) *Attorney, Agent, or Firm* — James Creighton Wray

(57) ABSTRACT

According to the present invention, there is provided a jackhammer trolley comprising a mainframe member with a clamp member at the bottom end and an extension bracket portion at the top end, a base frame member removably attached to the mainframe member by pivoting joints with at least one wheel member removably attached to its bottom, a handle member having a hand lever attached to said top end, and at least one vibration dampener fixed to said top or bottom end of the mainframe member.

9 Claims, 2 Drawing Sheets

JACKHAMMER TROLLEY

This invention relates to the improved handling of jackhammers, in particular, to a jackhammer trolley device which provides a method for supporting the jackhammer during transport and whilst not in operation, and a more ergonomic method for handling the jackhammer during operation without interfering with the jackhammer's intended use and functionality.

BACKGROUND OF THE INVENTION

Hand-operated jackhammers are primarily used in the construction industry as a tool for demolition, preparation and renovation of walls and floor, including those made out of cementitious materials. Conventional jackhammers require the operator to hand-lift, handhold and apply force during operation in an often awkward and uncomfortable bent-over position that can result in leg, arm and lower back pain, strain and injury.

Conventional hand-operated jackhammers are heavy manual machinery where an operator may be limited by construction industry health and safety requirements for lifting such machinery. Constant vibration caused by the jackhammer may also add to and compound these adverse effects on an operator. Further, regular and prolonged use of jackhammers may lead to secondary injuries such as repetitive strain injury (RSI).

The abovementioned problems are even more prevalent in countries where health and safety concerns and considerations are of a low priority or not enforced. Accordingly, this invention provides a jackhammer trolley device, which can ameliorate and minimises one or more of these problems and adverse affects on a jackhammer operator without interfering with the jackhammer's intended use and functionality.

BRIEF SUMMARY OF THE INVENTION

The present invention provides a jackhammer trolley device comprising:

A mainframe member;

A base frame member;

At least one wheel member;

A clamp member;

A handle member;

A hand lever member; and

At least one vibration dampener whereby the jackhammer trolley provides a means for easily supporting the jackhammer during transport and whilst not in operation, and a more ergonomic method for handling the jackhammer during operation without interfering with the jackhammer's intended use and functionality.

The arrangement may be such that the base frame member and mainframe member are adapted to pivot relative to one another about a pivot axis. Preferably the base frame member is pivotally moveable relative to the mainframe member. A pivoting joint may be provided between the base frame and mainframe that may be in the form of an axle and or pin/bolt. The pivoting joint may be mounted on the base frame member or mainframe member, while the pivoting element may be mounted on the other of the base frame member or the mainframe member.

It is preferred that the handle member and the mainframe member preferably have provided a vibration dampener(s) preferably made of polyurethane, rubber or any other suitable material which is/are removably fixed between these members and at least another trolley member.

It is preferred that the wheel member(s) may preferably be adapted to be removably attached to the bottom end of the base frame member by a pivotally moveable axle used to connect a wheel to a base frame member.

It is preferred that the clamp member may preferably be adapted to be removably attached to the downward end on the upper side of the mainframe member in a fixed position to enable a user to insert and hold a jackhammer as required.

It is preferred that the handle member may preferably be adapted to be removably attached over the top of the upper side of the mainframe member in a fixed position to enable a user to move and adjust the height of the handle member as required.

It is preferred that the hand lever member may preferably has provided a cable which is made of a wire material adapted to connect the hand lever to the locking pin assembly. In one preferred embodiment the locking pin assembly includes a compression spring and a pin that engages with the holding plate. The pin can be compressed against the spring easily by tensioning the hand lever to enable a user to selectively angle the base frame member pivotally relative to the mainframe member.

BRIEF DESCRIPTION OF THE SEVERAL VIEWS OF THE DRAWING

The invention will now be further explained and illustrated by reference to the accompanying drawings in which.

DETAILED DESCRIPTION OF THE INVENTION

Figure 1:
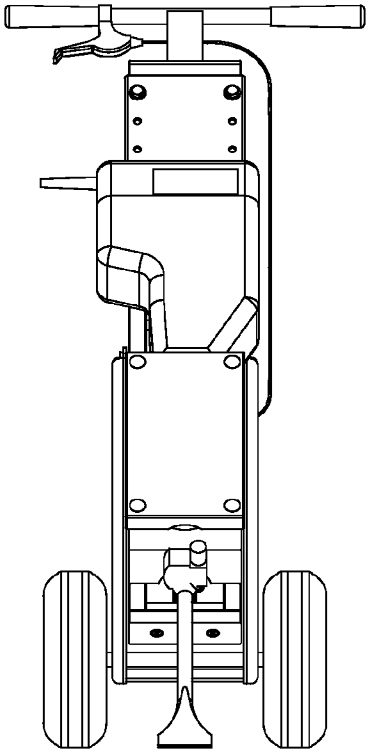
FIG. 1 is a front elevation of the jackhammer trolley supporting a jackhammer.
Figure 2:
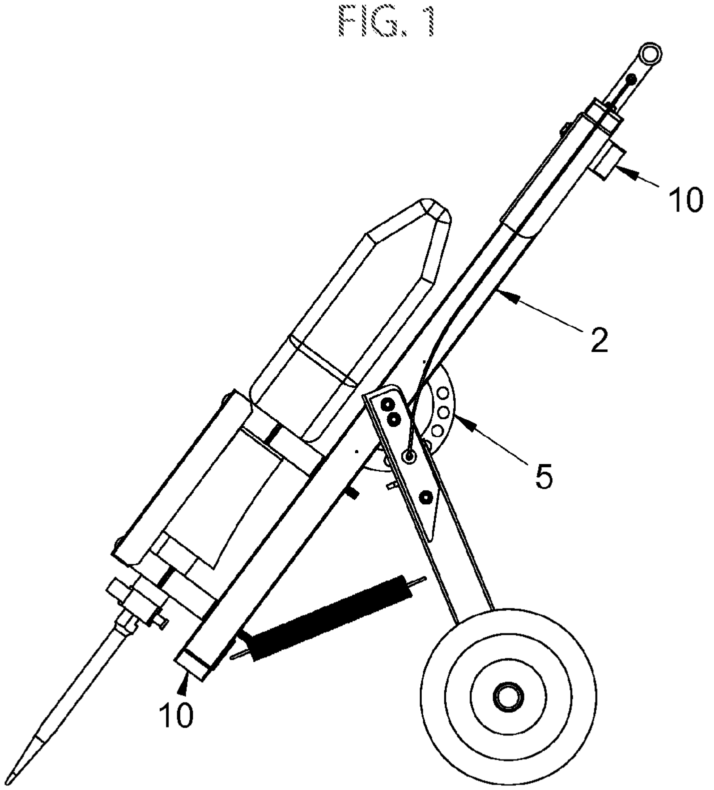
FIG. 2 is a side elevation view of FIG. 1.
Figure 3:
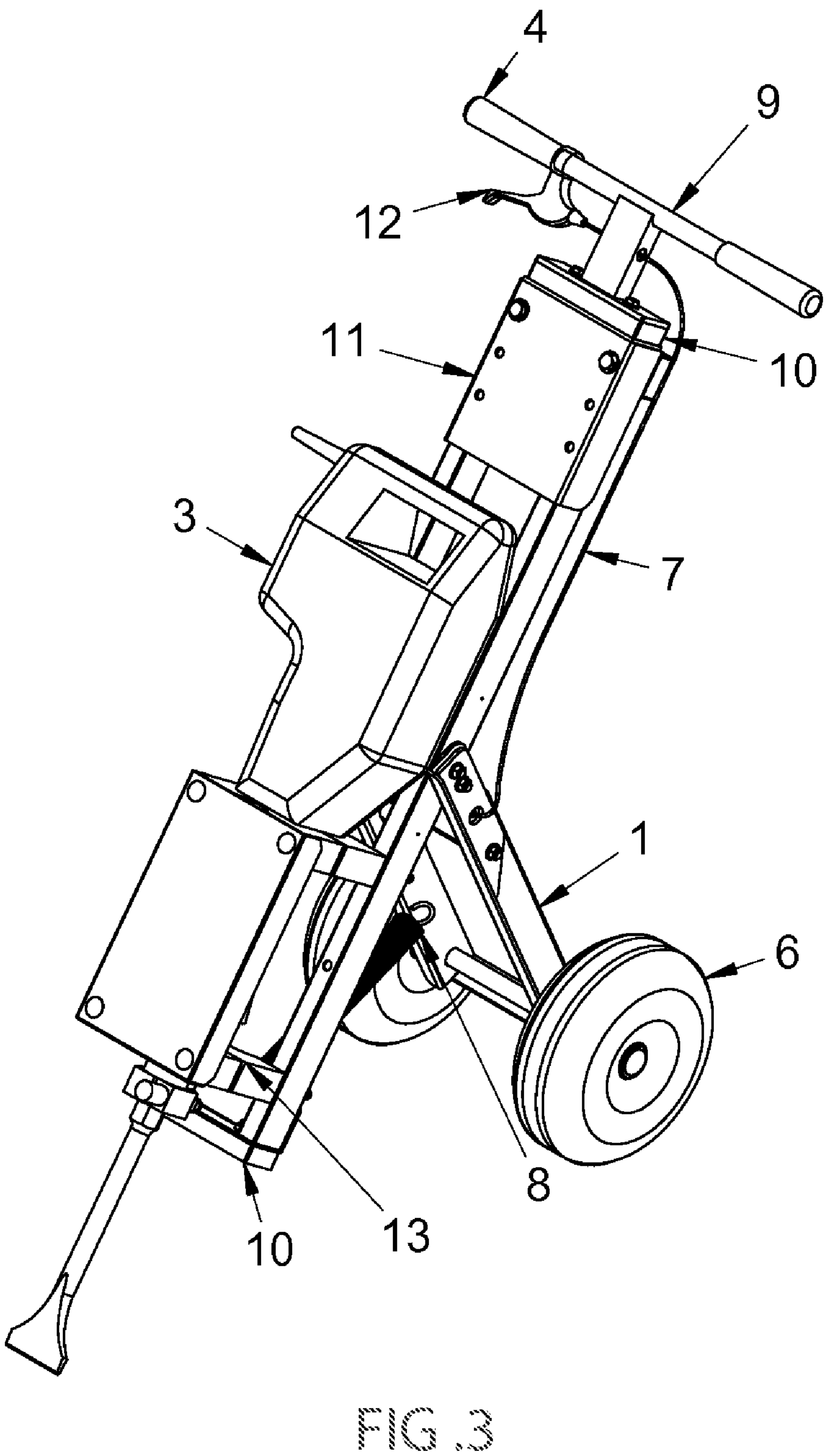
FIG. 3 is a perspective view of FIG. 1.

The invention provides a jackhammer trolley that provides a means for supporting the jackhammer during transport and whilst not in operation, and a more ergonomic method for handling the jackhammer during operation without interfering with the jackhammer's intended use and functionality. In a preferred embodiment, the jackhammer trolley will be adapted to lifting, holding and moving the jackhammer, however it is envisaged that the features of the trolley and dimensions and shape of the trolley and/or its features may be varied to suit different jackhammer types and/or other suitable applications.

The jackhammer trolley may preferably have provided a mainframe member 2, which is adapted to the underside of the clamp member 13 and removably engaged inside the extension bracket portion 11 connected to the handle member 9. The mainframe member 2 is preferably made of a metal material or any other suitable material, which is strong, durable and meets the requirements of the invention. Furthermore, the mainframe member 2 preferably has provided a vibration dampener(s) 10 preferably made of polyurethane, rubber or any other suitable material fixed at either end of the mainframe to reduce vibrations caused by the jackhammer traveling through the trolley to a user's hands. The bottom end of the mainframe member 2 has provided a tension spring 8 which is adapted to be connected to the underside of the base frame member 1 which may be adapted to pull the base frame 1 towards the mainframe 2 into a closed position when the lock pin is disengaged from the holding plate 5. Advantageously, when the clamp member 13 holds a jackhammer in position the tension spring 8 and the base frame member 1 absorb some of jackhammer's weight reducing the effort required by the user to lift or hold the trolley up. The holding plate 5 is preferably in the shape of a semi-circle with a plurality of openings, which is fixed and centered around the pivoting joint extending downwards from the mainframe member 2. The mainframe member 2 may preferably be adapted to pivot relative to the base frame member 1 about a pivot axis. A pivoting joint may be provided between the mainframe 2 and base frame 1 that may be in the form of an axle and or pin/bolt. The pivoting joint may be mounted on the base frame 1 or mainframe 2, while the pivoting element may be mounted on the opposing mainframe 2 or base frame member 1. In a preferred embodiment, the mainframe member 2 is adapted to have pivoting joints towards the middle and on either side of the mainframe and is removably attached to the pivoting joint at the top end of the base frame member 1.

The jackhammer trolley may preferably have provided a base frame member 1 which is adapted to have pivoting joints at the top end of the base frame 1 and be removably attached to wheel member(s) 6 at the bottom end of the base frame 1. It is envisaged that the base frame member 1 may have provided an opening for the cable to enter through and connect to the lock pin. Furthermore, the base frame member 1 may preferably have vibration dampener(s) 10 which may preferably be made of polyurethane, rubber or any other suitable material fixed at either end of the base frame 1 to reduce vibrations caused by the jackhammer traveling through the trolley to a user's hands.

It is preferred that the wheel member(s) 6 may preferably be adapted to be removably attached to the bottom end of the base frame member 1 by a pivotally moveable axle used to connect a wheel(s) to a base frame member 1. The wheel member(s) 6 may preferably be in the form of pneumatic, rubber or any other suitable material. Advantageously, the wheel member(s) 6 reduce vibrations caused by the jackhammer traveling through the trolley to a user's hands.

The jackhammer trolley may preferably have provided a clamp member 13, which is adapted to be removably attached to upper-side of the bottom end of the mainframe member 2 in a fixed position to enable a user to insert and hold a jackhammer as required. The clamp member 13 is in the form of a bottom section shaped to match the profile of the jackhammer that is removably attached to a top profile also shaped similarly to enable a user to open the top profile to insert and hold a jackhammer. Furthermore, the top profile can be locked and unlocked by a user. Advantageously, the clamp member 13 reduces vibrations caused by the jackhammer traveling through the trolley to a user's hands.

The jackhammer trolley may preferably have provided a handle member 9. The handle member 9 is preferably adapted to be attached to the top of the extension bracket portion 11. The extension bracket portion 11 preferably has provided a vibration dampener(s) 10 adapted to be removably fixed to the top of the extension bracket portion 11 and to the bottom of the handle member 9. The handle member 9 preferably has provided handle grips 4 that are adapted to be removably attached over each end of the handle member 9. The handle grips 4 are preferably made of polyurethane, rubber or any other suitable material to reduce vibrations caused by the jackhammer traveling through the trolley to a user's hands. The extension bracket portion 11 may preferably be adapted to be removably attached over the top of the upper side of the mainframe member 2 in a fixed position to enable a user to move and adjust the height of the handle member 9 as required. The hand lever member 12 is preferably removably attached to the handle member 9 which is preferably connected to the cable 7 which is made of a wire material or the like which is adapted to pass through the opening in the base frame 1 to connect to the locking pin. The hand lever 12 is positioned to easily enable a user to pull the hand lever 12 to tension the cable 7 to engage and disengage the locking pin from the holding plate 5 to selectively pivot the base frame member 1 relative to the mainframe member 2 about their pivot axis. In one preferred embodiment the locking pin assembly includes a compression spring and a pin that can engage and disengage with the holding plate 5. The pin can be removed from the holding plate 5 by compression of the spring caused by a user pulling the hand lever 12.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

The invention claimed is:

1. A jackhammer trolley comprising a mainframe member with a clamp member at a bottom end of the mainframe member and an extension bracket portion at a top end of the mainframe member, a base frame member removably attached to the mainframe member by at least one pivoting joint with at least one wheel member removably attached to a bottom end of the base frame member, a handle member having a hand lever attached to said top end, one or more vibration dampeners fixed to said top, bottom or both ends of the mainframe member, and a semi-circular holding plate extending in a direction in which the base frame member extends, the holding plate having a plurality of openings centered about the pivoting joint for connecting the holding plate to the base frame member.

2. A jackhammer trolley as claimed in claim 1 further comprising a tension spring connected between the mainframe member and the base frame member to pull the mainframe member and base frame member together when folding the jackhammer trolley into a closed position.

3. A jackhammer trolley as claimed in claim 1, wherein the pivoting joint is located towards the middle, and on either side of, the mainframe member to attach to a further pivoting joint at the top end of the base frame member.

4. A jackhammer trolley as claimed in claim 1, further comprising an opening in the base frame member for a cable to enter through to engage and disengage a lock pin with the holding plate.

5. A jackhammer trolley as claimed in claim 4, further comprising a locking pin assembly that comprises a compression spring to hold the lock pin in an engaged state with the holding plate.

6. A jackhammer trolley as claimed in claim 4, wherein the cable is operated by the hand lever.

7. A jackhammer trolley as claimed in claim 1, wherein the clamp member comprises of a bottom and top section shaped to match the profile of a jackhammer to enable a user to easily open the top section to insert, hold and lock the jackhammer.

8. A jackhammer trolley as claimed in claim 1, wherein the extension bracket portion is removably attached over the top end mainframe member to enable a user to move and adjust the position of the handle member relative to the mainframe member as required.

9. A jackhammer trolley as claimed in claim 8, wherein the handle member comprises handle grips removably attached over each end of the handle member.

* * * * *